United States Patent [19]

Nguyen et al.

[11] Patent Number: 5,673,415
[45] Date of Patent: Sep. 30, 1997

[54] HIGH SPEED TWO-PORT INTERFACE UNIT WHERE READ COMMANDS SUSPEND PARTIALLY EXECUTED WRITE COMMANDS

[75] Inventors: Kha Nguyen, Anaheim; Theodore Curt White, Tustin; Bruce Edward Moolenaar, Laguna Niguel, all of Calif.

[73] Assignee: Unisys Corporation, Blue Bell, Pa.

[21] Appl. No.: 698,212

[22] Filed: Aug. 14, 1996

Related U.S. Application Data

[63] Continuation of Ser. No. 161,963, Dec. 3, 1993, abandoned.

[51] Int. Cl.[6] ............................ G06F 12/00; G06F 13/00
[52] U.S. Cl. ................................. 395/476; 364/DIG. 1;
364/244.8; 364/246.1; 364/231.8; 395/458;
395/478; 395/481; 395/496
[58] Field of Search .................... 364/DIG. 1, 244.8,
364/246.1, 231.8; 395/474, 475, 476, 458,
478, 479, 481, 494, 496

[56] References Cited

U.S. PATENT DOCUMENTS

| | | | |
|---|---|---|---|
| 3,967,247 | 6/1976 | Andersen et al. | 340/172.5 |
| 4,604,682 | 8/1986 | Schwan et al. | 395/250 |
| 4,630,230 | 12/1986 | Sundet | 395/496 |
| 4,821,177 | 4/1989 | Koegel et al. | 395/425 |
| 4,862,354 | 8/1989 | Fiacconi et al. | 395/200.06 |
| 5,001,671 | 3/1991 | Koo et al. | 365/230.05 |
| 5,083,229 | 1/1992 | Frey et al. | 360/78.04 |
| 5,226,005 | 7/1993 | Lee et al. | 365/49 |
| 5,235,543 | 8/1993 | Rosen | 365/154 |
| 5,239,640 | 8/1993 | Froemke et al. | 395/180 |
| 5,247,637 | 9/1993 | Leedom et al. | 395/425 |
| 5,317,536 | 5/1994 | Aoyama | 365/189.04 |
| 5,321,652 | 6/1994 | Ito | 365/189.07 |
| 5,379,379 | 1/1995 | Becker et al. | 395/250 |
| 5,408,627 | 4/1995 | Stirk et al. | 395/425 |
| 5,428,760 | 6/1995 | Ghori et al. | 395/476 |
| 5,446,844 | 8/1995 | Steckler | 395/250 |

*Primary Examiner*—Tod R. Swann
*Assistant Examiner*—Tuan V. Thai
*Attorney, Agent, or Firm*—Charles J. Fassbender; Mark T. Starr; Steven R. Petersen

[57] ABSTRACT

In accordance with the present invention, a high speed two-part storage interface unit includes—1) a primary I/O port (input/output port) that couples to a plurality of data processing modules; 2) a secondary I/O port that couples to a main memory module, 3) input circuits for receiving three types of write commands and one type of read command from the data processing modules, 4) several write execution modules which are serially-coupled to a time-shared memory, and 5) a control circuit by which the write commands and read commands are performed. In one preferred embodiment, write commands are executed over several clock cycles by passing each such command with its write data word through the write execution modules in a pipelined fashion; read commands are executed at a rate of one command per clock cycle; a read command temporarily preempts the execution of any write command; an interrupt signal on the secondary I/O port stops the execution of read commands and write commands from the primary I/O port and enables data words to be transferred on the secondary I/O port; and write commands can be received on the primary I/O port while data is being transferred on the secondary I/O port.

10 Claims, 5 Drawing Sheets

HIGH SPEED TWO-PORT INTERFACE UNIT WHERE READ COMMANDS SUSPEND PARTIALLY EXECUTED WRITE COMMANDS

This is a continuation of application Ser. No. 08/161,963 filed on Dec. 3, 1993 is now abandoned.

BACKGROUND OF THE INVENTION

This invention relates to the structure and operation of a storage interface unit. By a storage interface unit is herein meant a digital logic circuit which has—1) a primary I/O port (input/output port) that couples to a plurality of data processing modules; 2) a secondary I/O port that couples to a main memory module, 3) input circuits for receiving three types of write commands and one type of read command from the data processing modules, and 4) several execute circuits and control circuits by which the write commands and read commands are performed.

One type of write command causes a single data word from a data processing module to be stored within the storage interface unit. A second type of write command causes a group of several data words to be transferred from the storage interface unit and stored within the main memory module. A third type of write command causes a group of several data words to be transferred from the main memory module and stored within the storage interface unit. And, the read command causes a single data word to be transferred from the storage interface unit to a data processing module.

One important measure of the effectiveness of any storage interface unit is the speed at which data can be read from the unit by a data processing module. Preferably, the storage interface unit and the primary I/O port operate in synchronization with a clock, and data can be read on the primary I/O port by a data processing module at a rate of one data word per clock cycle.

Also, another important measure of the effectiveness of any storage interface unit is the extent to which read commands can be executed without being slowed down or otherwise hindered by the executive of write commands. Preferably, any read command temporarily preempts the execution of write commands. Also preferably, the time duration of a single clock cycle is just long enough to execute one read command, even though such a clock cycle may not be long enough to execute a write command.

A further measure of the effectiveness of any storage interface unit is a capability to temporarily stop the execution of read commands and write commands from the primary I/O port in response to an interrupt signal on the secondary I/O port. With such a capability, the storage interface unit can be controlled from the main memory module whenever data is being written therein or read therefrom during the second and third type write commands. Preferably, while the interrupt signal is true, write commands can simultaneously be received on the primary I/O port.

Prior to the present invention, no storage interface unit had any of the above described preferred capabilities. Accordingly, a primary object of the present invention is to provide a storage interface unit which has all of the above described capabilities.

BRIEF SUMMARY OF THE INVENTION

In accordance with the present invention, a storage interface unit includes—1) a primary I/O port (input/output port) that couples to a plurality of data processing modules; 2) a secondary I/O port that couples to a main memory module, 3) input circuits for receiving three types of write commands and one type of read command from the data processing modules and 4) several execute circuits and control circuits by which the write commands and read commands are performed.

In one preferred embodiment, read commands are executed at a rate of one command per clock cycle; a read command temporarily preempts the execution of any write command; an interrupt signal on the secondary I/O port stops the execution of read commands and write commands from the primary I/O port and enables data words to be transferred on the secondary I/O port; and write commands can be received on the primary I/O port while data is being transferred on the secondary I/O port.

BRIEF DESCRIPTION OF THE DRAWINGS

The present invention is described herein in conjunction with the following drawings wherein.

DETAILED DESCRIPTION

Figure 1:
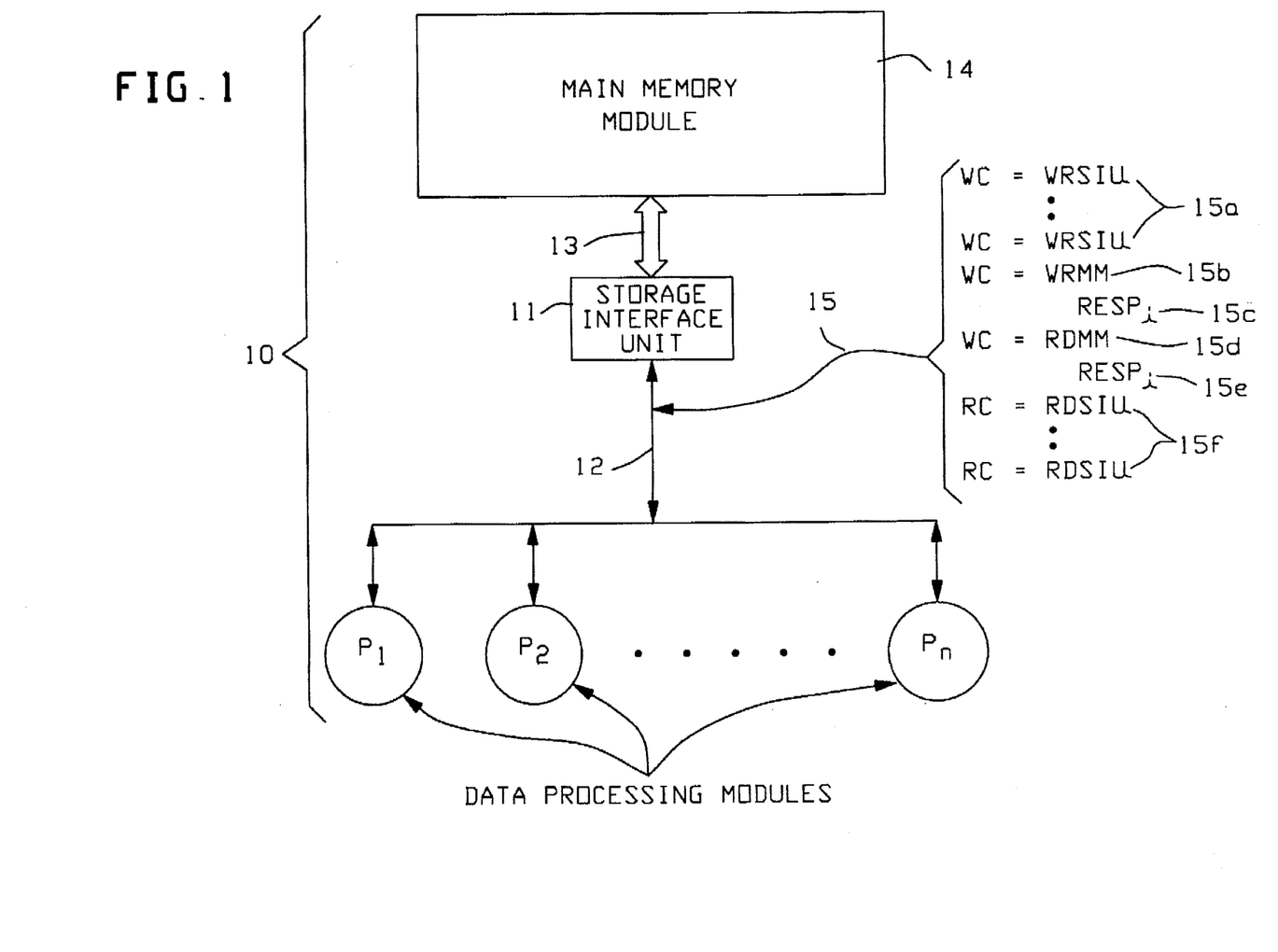
FIG. 1 is an overview of a data processing system which includes a storage interface unit that is structured and operates in accordance with the present inventions.

Referring now to FIG. 1, it shows a data processing system 10 that includes a storage interface unit 11 which constitutes one preferred embodiment of the present invention. This storage interface unit 11 has a primary I/O port 12 to which several data processing modules $P_1$ thru $P_n$ are connected; and, the storage interface unit 11 also has a secondary I/O port 13 to which a main memory module 14 is connected.

Each of the data processing modules uses the storage interface unit 11 to write data into the main memory module 14 and to subsequently read data from the main memory module 14. This is achieved via a sequence 15 of several types of write commands WC and read commands RC which are sent on the primary I/O port 12 from a data processing unit to the storage interface unit 11.

Initially, four write commands WC of a type which specify WRSIU operations (write storage interface unit operations) are sent by one of the data processing modules $P_i$ to the storage interface unit 11 as indicated by reference numeral 15a. In each WRSIU operation, a single data word is transferred from the data processing module $p_i$ and stored within the storage interface unit 11. Each word of date consists of fifty-three data bits and one odd parity bit.

Next, a write command WC of a type which specifies a WRMM operation (write main memory operation) is sent by the data processing module $P_i$ to the storage interface unit 11 as indicated by reference numeral 15b. In a WRMM operation, the storage interface unit 11 transfers to the main memory module 14, all four of the data words that were previously stored within the storage interface unit 11 by the commands 15a. When that WRMM operation is complete, the storage interface unit 11 sends a response signal $RESP_i$, as indicated by reference numeral 15c, to the data processing module $P_i$.

To read data from the main memory module 14, the data processing module $P_i$ sends a write command WC of a type which specifies a RDMM operation (read main memory operation) as indicated by reference numeral 15d. In a RDMM operation, the storage interface unit 11 retrieves and internally stores four adjacent data words from the main memory module 14 via the secondary I/O port 13. When that RDMM operation is complete, the storage interface unit 11 sends a response signal $RESP_i$, as indicated by reference numeral 15e, back to the data processing module $P_i$.

Those four data words which are in the storage interface unit 11 are retrieved by the data processing module $P_i$ by sending a sequence of four read commands RC which specify RDSIU operations (read storage interface unit operations) as indicated by reference numeral 15f. In each RDSIU operation, the storage interface unit 11 transfers a single data word via the primary I/O port 12 back to the data processing module $P_i$.

Figure 2:
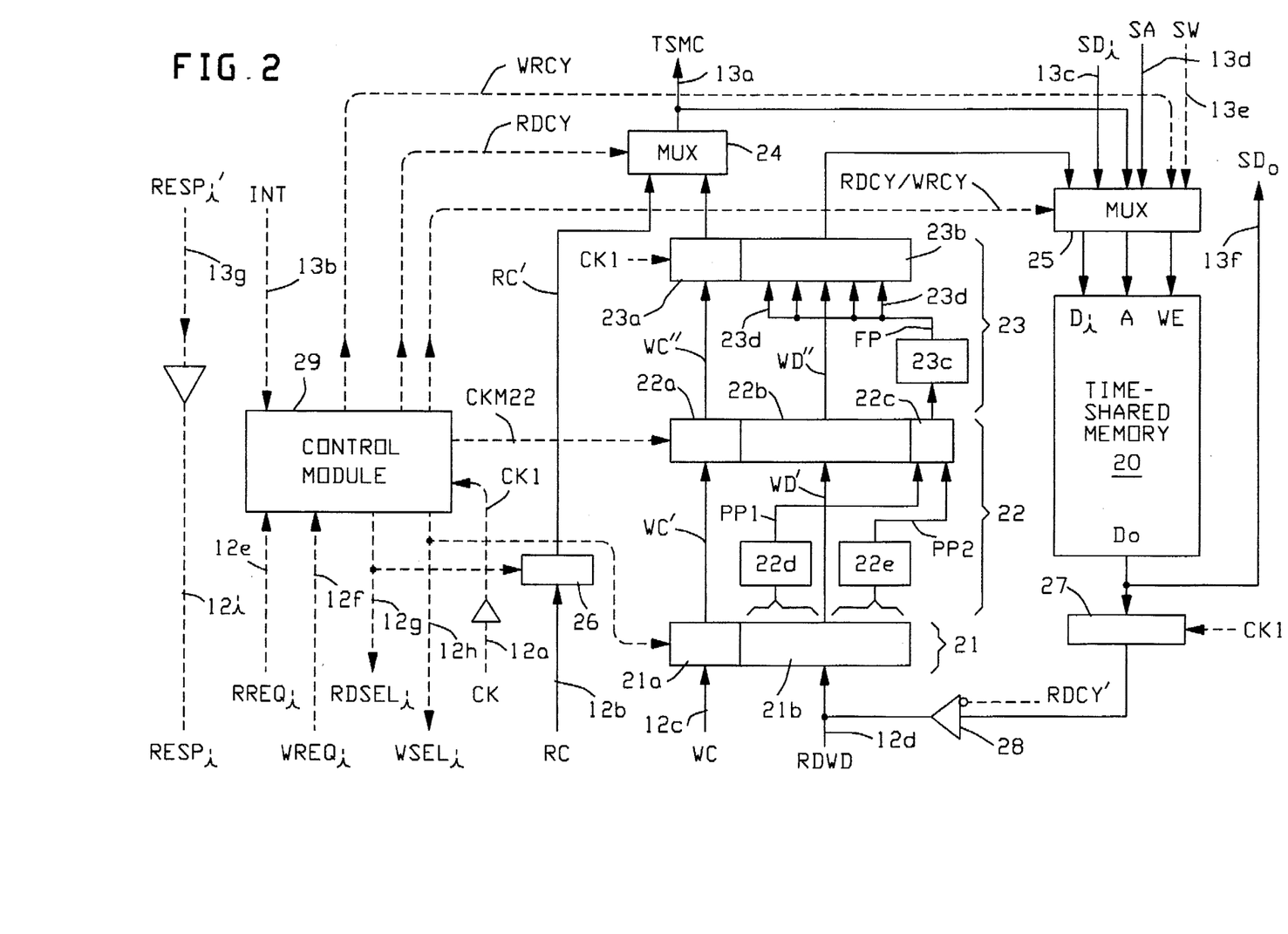
FIG. 2 is a block diagram of one preferred embodiment of the storage interface unit of FIG. 1.

Turning now to FIG. 2, it shows a preferred embodiment of the circuitry which is within the storage interface unit 11 and by which all of the above described commands 15 are performed. That circuitry includes a set of conductors 12a–12i which make up the primary I/O port 12, a set of conductors 13a–13h which make up the secondary I/O port 13, and an internal time-shared memory 20 which temporarily stores the data words that are used in the commands 15.

Conductor 12a on the primary I/O port carries a cyclic clock signal CK; and this clock signal is utilized to synchronize all of the operations that are performed by the FIG. 2 circuits. Those operations and their relation to the clock signal CK are described in detail herein in conjunction with FIGS. 3 and 4.

Conductors 12b on the primary I/O port carry the read command signals RC in synchronization with the clock signal CK. Each read command RC includes an operation code which specifies a RDSIU operation and an address for the time-shared memory 20 at which data is to be read.

Similarly, the conductors 12c on the primary I/O port carry write command signals WC in synchronization with the clock signal CK. Each write command includes an operation code which specifies either a WRSIU operation or WRMM operation or RDMM operation, an address for the time-shared memory 20, and an ID number "i" which identifies the particular data processing module $P_i$ that is sending the command.

Conductors 12d in the primary input port 12 comprise a time-shared data bus 12d which carries both read data, write data and main-memory addresses in a time-shared fashion. All signals on the bus 12d are indicated in FIG. 2 as RDWD signals. When a RDSIU operation is specified in a read command RC, the time-shared bus 12d is used to carry read data; whereas when a WRSIU operation is specified in a write command WC, the bus 12d is used to carry write data. Also, when a RDMM operation or WRMM operation is specified in a write command WC, the time-shared data bus 12d is used carry the starting address for the main memory module 14 at which data words are to be read or written.

Conductors 12e–12i in the primary I/O port 12 carry various control signals. To help make FIG. 2 easier to understand, conductors which carry control signals or the clock signal are shown as dashed lines; whereas conductors which carry either data signals or address signals or command signals are drawn as solid lines.

Conductors 12e carry a respective read request signals ($RREQ_i$) for each data processing module that is requesting to send a read command RC. Likewise, conductors 12f carry a respective write request signal ($WREQ_i$) for each data processing unit that is requesting to send a write command WC.

Conductors 12g carry read select signals ($RSEL_i$) which identify a data processing unit that may send a read command RC. Likewise, conductors 12h carry write select signals ($WSEL_i$) which identify a data processing module that may send a write command WC. For example, a true $WSEL_2$ signal indicates that data processing module $P_2$ may send a write command WC.

Lastly, conductors 12i carry the response signal $RESP_i$ which was previously indicated by reference numerals 15c and 15e of FIG. 1. This response signal indicates when the RDMM instruction or WRMM instruction is complete, and it is sent to the data processing module which initiated that instruction.

Considering now the secondary I/O port 13, it includes a set of conductors 13a which carry time-shared memory command signals TSMC which indicate the command that is currently being executed by the time-shared memory 20. Those command signals TSMC are monitored by the main memory module 14; and based on their content, the main memory module 14 sends an interrupt signal INT back to the storage interface unit on a conductor 13b.

While the interrupt signal INT is true, the FIG. 2 storage interface unit stops its internal execution of read commands RC and write commands WC from the primary I/O port 12. Also, while the interrupt signal INT is true, other conductors 13c–13g on the secondary I/O port 13 enable the time-shared memory 20 to be read and/or written by the main memory module 14.

Specifically, conductors 13c carry secondary data input signals $SD_i$ for storage in the memory 20; conductors 13d carry secondary address signals SA for addressing the memory 20; and a conductor 13e carries a secondary write signal for the memory 20. Data which is read from the memory 20 is transmitted in the secondary I/O port on conductors 13f. Lastly in the secondary I/O port, a set of conductors 13g carry signals $RESP_i'$; and those signals are retransmitted on the primary I/O port conductors 12i to the respective data processing modules as the response signals $RESP_i$.

To receive the write commands WC and corresponding write data WD from the primary I/O port 12, the FIG. 2 memory interface unit includes a write input circuit 21. One portion of the circuit 21 is a register 21a which receives a single write command WC from the conductors 12c, while another portion of the circuit 21 is a register 21b which receives corresponding write data from the conductors 12d.

Each write command which is received by the write input circuit 21, is passed with its corresponding write data through two serially intercoupled write circuit modules 22 and 23. Then, from module 23, the write command with its write data is passed through two multiplexors 24 and 25 to the time-shared memory 20 where the write data is stored.

Module 22 includes three registers 22a, 22b, and 22c; and it also includes two parity check circuits 22d and 22e. Register 22a receives and stores a write command WC' from register 21a; register 22b receives and stores write data WD' from register 21b; and register 22c receives and stores partial parity signals PP1 and PP2 respectively from the parity check circuits 22d and 22e.

Module 23 includes two registers 23a and 23b, and it also includes one parity check circuit 23c. Register 23a receives and stores a write command WC" from register 22a; and register 23b receives and stores write data WD' from register 22b together with the final parity signal FP from parity check circuit 23c.

Partial parity signals PP1 from circuit 22d indicate when the data in the left half of register 21b has odd parity; whereas the partial parity signals PP2 from circuit 22c indicate when the data in the right half of register 21b has odd parity. Those partial parity signals PP1 and PP2 are then combined by the circuit 23c to form the final parity signal FP which indicates if the entire word of data in register 22b has odd parity. If the entire word of data is register 22b does not have odd parity, then the signal FP is used to mark each byte of data in register 23b as being corrupted, and this is indicated by the FP signal path 23d.

By performing the task of checking parity on a word of data over two clock cycles, the total number of data bits in a data word can be large while the time duration of each clock pulse can be small. In the particular embodiment of FIG. 2, each word of data contains fifty-three data bits and a single clock pulse lasts sixty nanoseconds. By comparison, if parity was checked in one clock pulse, the clock pulse would need to last twice as long (i.e.—one hundred twenty nanoseconds.) But as will be shown shortly in conjunction with FIG. 3, a read command is executed in just one clock pulse, so doubling the time duration of each clock will double the execution time of each read command RC.

To receive and store the read commands RC from the primary I/O port conductors 12b, the FIG. 2 storage interface unit includes a read input circuit 26. Each read command which is stored by the read input circuit 26 is executed by passing it through the multiplexors 24 and 25 to the time-shared memory 20. That memory 20 responds to each read command by sending a word of data to an output register 27, and data from register 27 is passed through a buffer 28 to the read/write data lines 12d of the primary I/O port.

Lastly included in the FIG. 2 storage interface unit is a control module 29 which generates various control signals as shown on the dashed lines of FIG. 2. All of the circuitry within the control module 29 is described hereinafter in conjunction with FIG. 5. Control signals from the control module 29 direct the execution of the read commands RC and the write commands WC which are received from the primary I/O port, as will now be described in conjunction with the timing diagrams of FIGS. 3 and 4.

Figure 3:
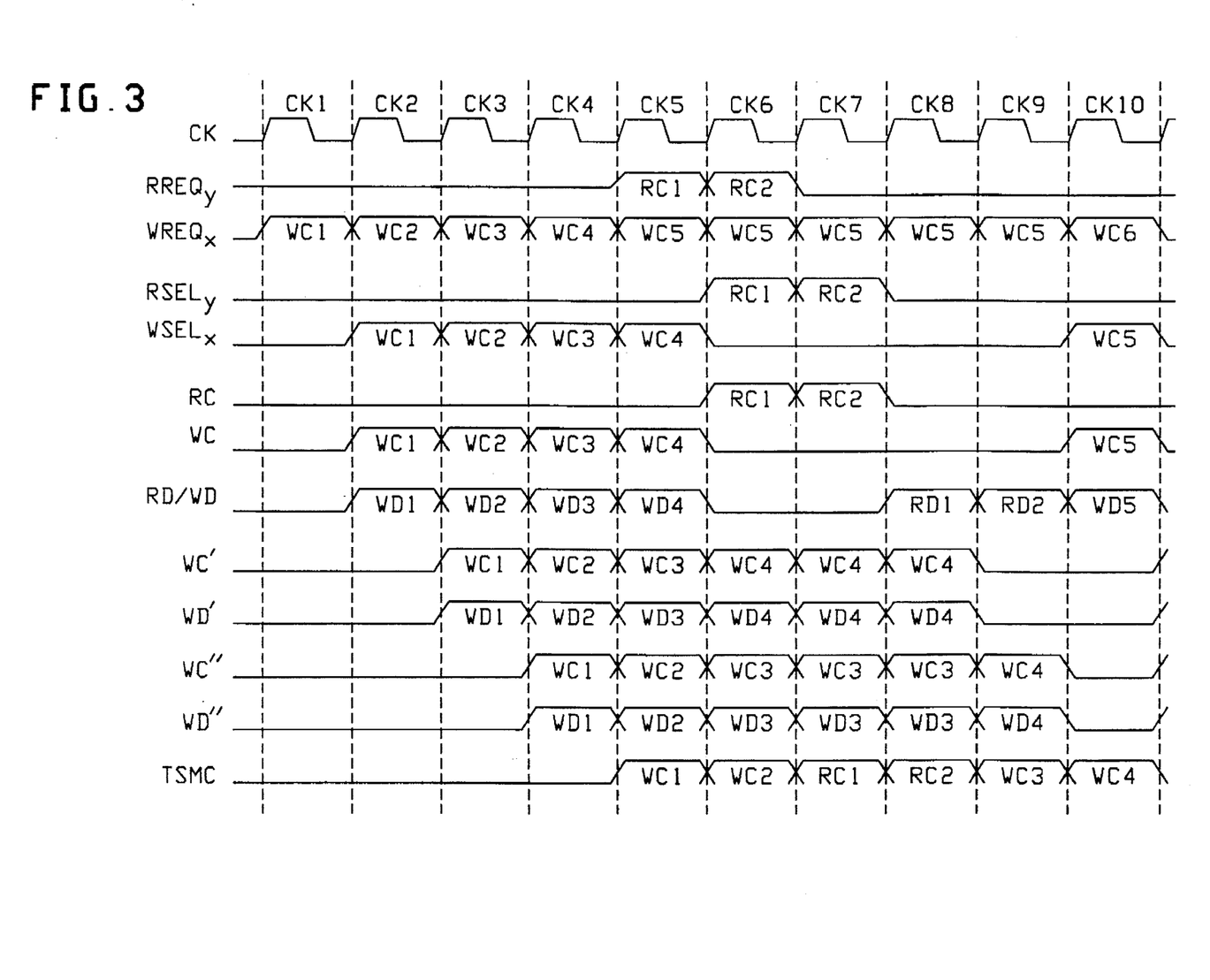
FIG. 3 is a timing diagram which illustrates a sequence in which read commands preempt the execution of write commands within the storage interface unit of FIG. 2.

In FIG. 3, the overall operation which is being performed is that one of the data processing modules $P_x$ sends a sequence of write commands, each of which specifies a WRSIU operation; and in the middle of that command sequence, another data processing module $P_y$ sends two read commands RC, each of which specifies a RDSIU operation. Each of the write commands and read commands is sent in synchronization with the clock signal CK. For ease of reference, the first clock pulse is labeled CK1; the second clock pulse is labeled CK2; etc.

In detail, the FIG. 3 signal sequence is as follows. During the first clock pulse CK1, a true $WREQ_x$ signal indicates a request to send a first write command. This first write command is labeled WC1 in the $WREQ_x$ signal during clock pulse CK1.

Likewise, during clock pulses CK2, CK3, and CK4, the true $WREQ_x$ signal indicates a request by data processing module $P_x$ to respectively send a second write command, a third write command, and a fourth write command. These second, third, and fourth write commands are respectively labeled WC2, WC3, and WC4 in the $WREQ_x$ signal during clock pulses CK2, CK3, and CK4.

Next, during clock pulse CK5, the true $WREQ_x$ signal indicates a request by data processing module $P_x$ to send a fifth write command WC5; and simultaneously, the true $RREQ_y$ signal indicates a request by data processing Module $P_y$ to send a first read command RC1. Likewise, during clock pulse CK6, the true $RREQ_y$ signal indicates a request by data processing module $P_y$ to send a second read command RC2; and at the same time, the true $WREQ_x$ signal indicates another request by data processing module $P_x$ to send the fifth write command WC5.

Thereafter, during each of the clock pulses CK7 thru CK9, the true $WREQ_x$ signal again indicates an additional request by data processing module $P_x$ to send the fifth write command WC5. These requests to send the fifth write command WC5 occur because within the FIG. 2 storage interface unit, read commands are executed with a higher priority than write command; and thus execution of the write commands get preempted.

After the execution of the read commands RC1 and RC2 has proceeded to a certain point, then execution of write commands is resumed. This resumption starts to occur in FIG. 3 during clock pulse CK9 wherein the time-shared memory command TSMC is the third write command WC3.

Whenever a write request signal $WREQ_x$ is sent during one clock pulse and the storage interface unit is ready to accept the write command, then the storage interface unit sends a true write select signal $WSEL_x$ during the next clock pulse. For example, in FIG. 3, the $WSEL_x$ signal during clock pulse CK2 indicates that the storage interface unit will accept the first write command WC1 which data processing module $P_x$ was requesting to send during clock pulse CK1. Conversely, a false $WSEL_x$ signal during clock pulse CK6 indicates that the storage interface unit is not ready to accept the fifth write command WC5 which data processing module $P_x$ is requesting to send during clock pulse CK5.

When data processing module $P_y$ makes a request to send a read command during one clock pulse and the storage interface unit is ready to accept that read command, then this is indicated by the true state of the read select signal $RSEL_y$ during the next clock pulse. For example, the true state of the $RSEL_y$ signal during clock pulse CK6 indicates that the storage interface unit is ready to accept the first read command RC1 which data processing module $P_y$ is requesting to send during clock pulse CK5.

During each clock pulse that the $WSEL_x$ signal is true, a write command WC is placed on the conductors 12c and corresponding write data WD is placed on the time-shared data bus 12d by data processing module $P_x$. Then, at the end of that clock pulse, the write command is stored in register 21a as command WC' and the write data is stored in register 21b a data WD'. These signals WC, RD/WD, WC', and WD' are shown in FIG. 3.

For example, the first write command on the conductors 12c is labeled WC1 in signal WC during clock pulse CK2, and the corresponding write data on the conductors 12d for the first write command is labeled as WD1 in the signal RD/WD during clock pulse CK2. Then, one clock pulse later, the first write command and corresponding write data are held in the registers 21a and 21b. This is shown by signal WC'=WC1 and signal WD'=WD1 during clock pulse CK3.

Each write command that is received by the register 21 in the storage interface unit is executed by—a) passing that write command and its corresponding write data through write circuit module 22 during one clock pulse; b) passing that write command and its corresponding write data through write circuit module 23 during a second clock pulse; and c) actually storing the write data in the time-shared memory 20 during a third clock pulse. This three clock pulse execution of a write command by the write circuit modules 22 and 23 together with the time-shared memory 20 is shown in FIG. 3 by the bottom five signals WC', WD', WC'', WD'', and TSMC.

For example, inspection of FIG. 3 during the clock pulse CK5 shows that three different write commands WC1, WC2, and WC3 are simultaneously being executed in a pipelined fashion. Specifically, the command which is being executed by the time-shared memory 20 is the first write command WC1; the command which is being executed by write circuit module 23 is the second write command WC2; and the command which is being executed by write circuit module 22 is the third write command WC3.

If all of the read request signals $RREQ_y$ were false during the clock pulses CK5 and CK6, then the above described pipelined execution of three write commands would continue. During clock pulse CK6 the write commands WC2, WC3, WC4, would be executed; during clock pulse CK7 the write commands WC3, WC4, WC5 would be executed; etc. However, the two read commands as indicated by the occurrence of the $RREQ_y$ signal during clock pulses CK5 and CK6 temporarily preempt the execution of further write commands.

During clock pulse CK6, the storage interface unit causes the $RSEL_y$ signal to go true; and in response, the first read command RC1 is sent on the conductors 12b. That first read command RC1 is then stored in register 26 at the end of clock pulse CK6. Likewise, in response to the $RREQ_y$ signal during clock pulse CK6, the storage interface unit forces the $RSEL_y$ signal true during clock pulse CK7; and that in turn causes the second read command RC2 to be sent on the conductors 12b whereupon it is stored in register 26 at the end of clock pulse CK7.

During the clock pulse which immediately follows the storing of a read command RC in register 26, that read command is sent through the multiplexors 24 and 25 to the time-shared memory 20 to read certain data. This is indicated by the time-shared memory command signal TSMC in FIG. 3 during clock pulses CK7 and CK8. During clock pulse CK7, the first read command RC1 addresses the memory 20; and during clock pulse CK8, the second read command RC2 addresses the memory 20.

Each read command that addresses the memory 20 causes a word of data to be retrieved therefrom, stored in register 27, and sent through buffer 28 to the time-shared data bus 12d. This is indicated in FIG. 3 by the signal RD/WD during clock pulses CK8 and CK9. During clock pulse CK8, the time-shared data bus 12d carries the first word of read data RD1 which was retrieved from the time-shared memory 20 by the first read command RC1; and during clock pulse CK9, the time-shared data bus 12d carries the second word of read data RD2 which was retrieved from the time-shared memory by the second read command RC2.

From the above, it is seen that one feature of the FIG. 2 storage interface unit is that it retrieves data words from the time-shared memory 20 very quickly. Specifically, between the time when a read command RC is sent on the primary I/O port and the time which data is sent on the primary I/O port, only one clock pulse occurs.

After the above two read commands have addressed the time-shared memory 20, that memory is available to execute a write command. Thus, during clock pulse CK9, the third write command WC3 and it's corresponding write data WD3 are sent to the time-shared memory 20; and this is indicated by the signal TSMC being equal to the third write command WC3 during clock pulse CK9. That third write command WC3 and its write data were being held in registers 23a and 23b prior to clock pulse CK9 when execution of write commands was preempted by the two read commands RC1 and RC2.

Figure 4:
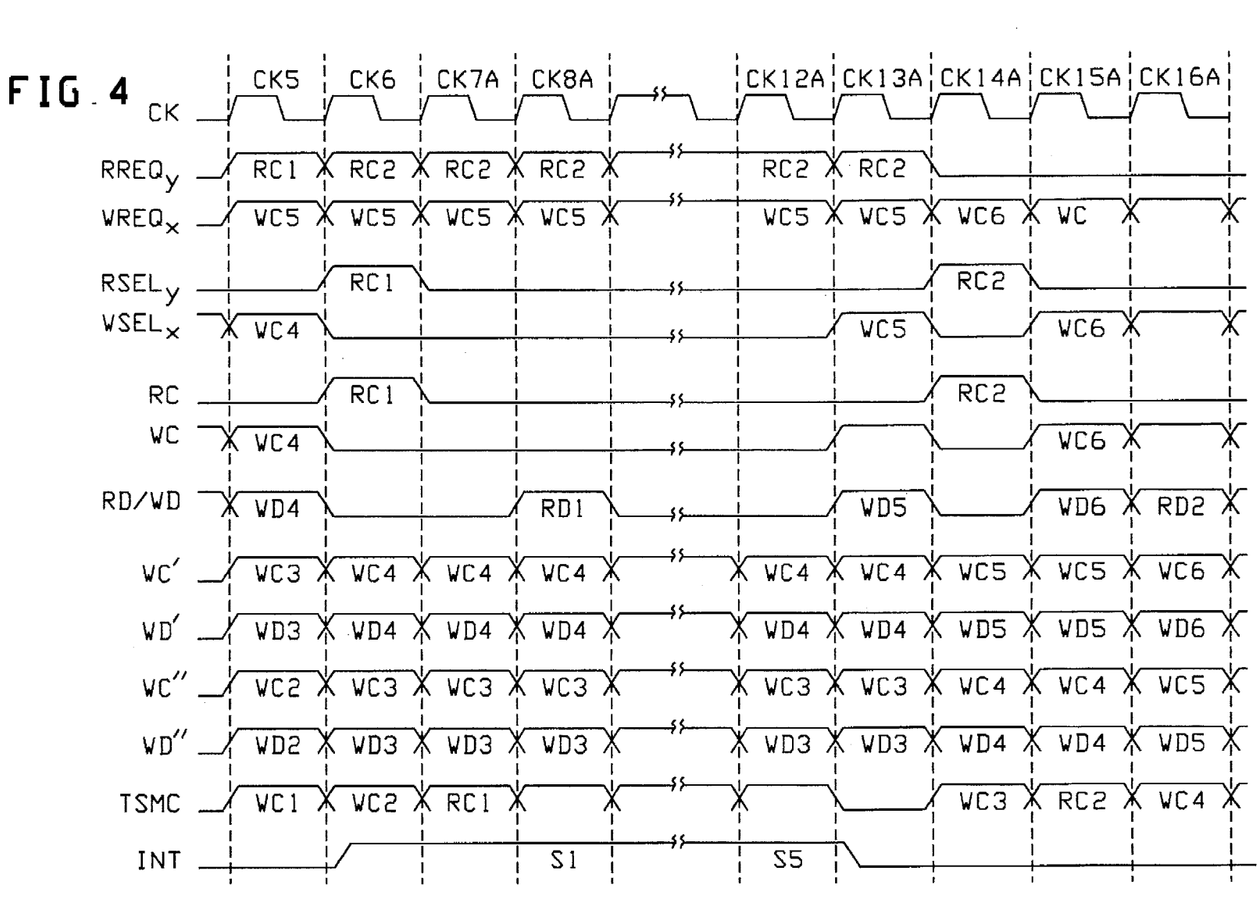
FIG. 4 is a timing diagram which illustrates a sequence in which the storage interface unit of FIG. 2 temporarily suspends the execution of write commands and read commands in response to an interrupt signal on the secondary I/O port; and, FIG. 5 is a detailed logic diagram of a control circuit within the storage interface unit of FIG. 2.

Suppose now that in the FIG. 3 sequence, the second write command WC2 does not specify a WRSIU operation but instead specifies a WRMM operation or an RDMM operation. In that case, the FIG. 3 sequence will be modified as shown in FIG. 4. In FIG. 4, the first two clock pulses are labeled CK5 and CK6, whereas subsequent clock pulses are labeled CK7A, CK8A, etc. Clock pulses CK5 and CK6 of FIG. 4 are exactly the same as clock pulses CK5 and CK6 of FIG. 3; and the state of all other signals in FIGS. 3 and 4 during clock pulses CK5 and CK6 are also the same.

During clock pulse CK6A, the second write command WC2 is passed from register 23a in the storage interface unit through multiplexors 24 and 25 to the time-shared memory 20. At the same time, that second write command WC2 is sent on conductors 13a to the secondary I/O port where it is examined by the main memory module 14. When the main memory module 14 senses that the time-shared memory command TSMC specifies either a WRMM operation or a RDMM operation, the main memory module 14 generates the interrupt signal INT on conductor 13B in a true state. This is shown in FIG. 4 as occurring during clock pulse CK6. Then, in the next clock pulse CK7A in response to the interrupt signal, the control module 29 of the storage interface unit forces the $RSEL_y$ signals and $WSEL_x$ signals false.

As long as the interrupt signal INT to the control module 29 in the storage interface unit remains true, that control module continually forces the read select signals $RSEL_y$ and the write select signals $WSEL_x$ to a false state. This is shown in FIG. 4 as occurring during clocks CK7A thru CK12A. By forcing the $RSEL_y$ and $WSEL_x$ signals false, the storage interface unit stops additional read commands and write commands from being sent on the primary I/O port; however, any read command RC which is already in register 26 is executed. Thus, during clock pulse CK7A, the first word of read data RD1 is sent on the time-shared data bus.

Thereafter, during clock pulses CK8A through CK12A, five other commands S1 thru S5 are executed by the time-shared memory 20 as provided on the secondary I/O port on the conductors 13c–13g. By these five secondary I/O port commands, a main memory address is to be read from the time-shared memory 20 and four words of data are written into or read from the time-shared memory 20.

After the interrupt signal INT goes false, additional read commands and additional write commands will be accepted from the primary I/O port by the storage interface unit. This occurs in FIG. 4 during clock pulses CK13A thru CK16A.

At the start of clock pulse CK13A, the interrupt signal INT switches from a true state to a false state; and that false state of the interrupt signal together with the true state of the read request signal $RREQ_y$ causes the read select signal $RSEL_y$ to go true during the next clock pulse CK14A. Then, due to the read select signal $RSEL_y$ being true during clock pulse CK14A, a second read command RC2 is sent by the read command signals RC on the primary I/O port. That second read command RC2 is stored in register 26 of the storage interface unit at the start clock pulse CK15A; and in that same clock pulse, the second read command RC2 is sent through multiplexors 24 and 25 to the time-shared memory 20. Data from the time-shared memory 20 as addressed by the second read command RC2 is stored in register 27 at the start of clock pulse CK15A whereupon it is transferred to the time-shared data bus 12d as the second word of read data RD2.

Inspection of FIG. 4 during clock pulses CK13A and CK14A also shows that during those clock pulses, the time-shared memory 20 is not executing any read command and thus it is free to execute a write command. Such a write command which has been waiting for execution is the third write command WC3 in registers 23a and 23b. So, in response to the interrupt signal INT being false and register 23a being full with a write command during clock pulse CK13A, the third word of write data WD3 is written into the time-shared memory 20 during clock pulse CK14A.

Figure 5:
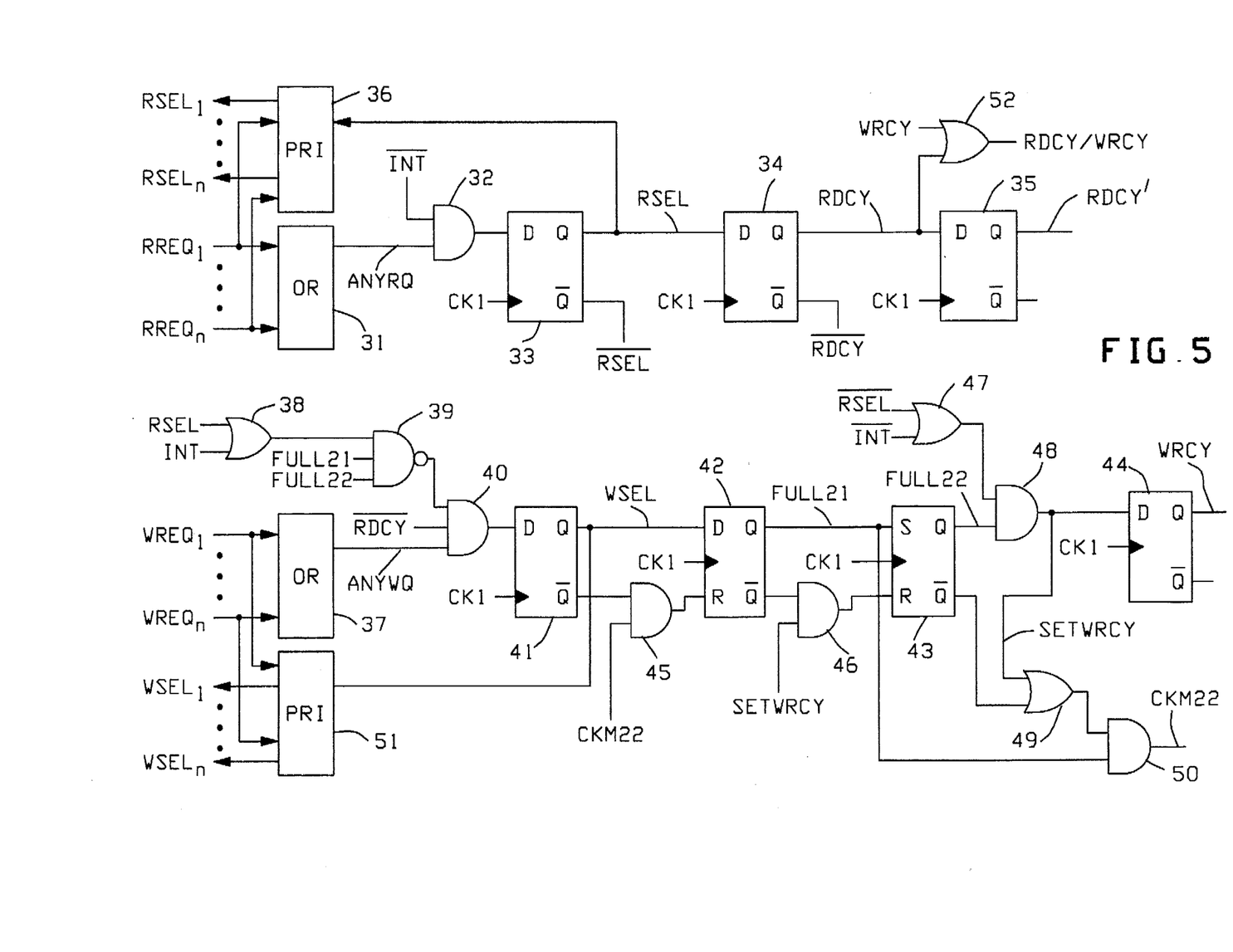

Turning now to FIG. 5, it shows the details of a preferred embodiment of the control module 29 in the FIG. 2 storage interface unit. This FIG. 5 control module generates various control signals such as RDCY, WRCY, etc. as labeled in FIG. 5. Those same control signals are shown on the dashed line conductors in FIG. 2 where they direct the execution of the write commands WC and read commands RC as was described above in conjunction with the timing diagrams of FIGS. 3 and 4. All of the components in the FIG. 5 control module are identified below in Table 1.

TABLE 1

| COMPONENT | DESCRIPTION |
| --- | --- |
| 31 | An N input OR gate |
| 32 | A two input AND gate |
| 33 | A D-type clocked flip-flop |
| 34 | A D-type clocked flip-flop |
| 35 | A D-type clocked flip-flop |
| 36 | An N input priority circuit |
| 37 | An N input OR gate |
| 38 | A two input OR gate |
| 39 | A three input AND gate |
| 40 | A three input AND gate |
| 41 | A SR-type clocked flip-flop |
| 42 | A SR-type clocked flip-flop |
| 43 | A D-type clocked flip-flop |
| 44 | A D-type clocked flip-flop |
| 45 | A two input AND gate |
| 46 | A two input AND gate |
| 47 | A two input OR gate |
| 48 | A two input AND gate |
| 49 | A two input OR gate |
| 50 | A two input AND gate |
| 51 | An N input priority circuit |
| 52 | A two input or gate |

In operation, the read request signals $RREQ_1$ thru $RREQ_n$ are respectively sent from the data processing units $U_1$ thru $U_n$ and received by the OR gate 31; and if any one of those read request signals is true, then a signal ANYRQ on the output of OR gate 31 is true. That signal ANYRQ is ANDed with the inverse of the interrupt signal by AND gate 32; and the output signal from AND gate 32 is sent to the D input of flip-flop 33. Thus, if any read request signal $RREQ_i$ is true and the interrupt signal INT is false, then flip-flop 33 gets set in synchronization with the clock CK.

When flip-flop 33 is set, a signal RSEL on the Q output of flip-flop 33 is true. Signal RSEL is sent to the priority circuit 36 along with all of the read request signals $RREQ_1$ thru $RREQ_n$. When signal RSEL is true, the priority circuit 36 selects one true read request signal $RREQ_i$ and generates a corresponding read select signal $RSEL_i$ in a true state.

Whenever flip-flop 33 is set during one clock pulse, then flip-flop 34 gets set in the next clock pulse. Likewise, whenever flip-flop 34 is set during one clock pulse, then during the next clock pulse flip-flop 35 gets set. Those two flip-flops 34 and 35 respectively generate on their Q output a read cycle signal RDCY and a delayed read cycle signal RDCY'.

Signal RDCY, as is seen in FIG. 2, is received by multiplexor 24 and signal RDCY' is received by buffer 28. When the signal RDCY is true, the multiplexor 24 passes the read command in register 26 to its output and the time-shared memory 20 executes that read command. Conversely, when signal RDCY is false, the multiplexor 24 passes the write command in register 23a to its output. When signal RDCY' is true, the buffer 28 passes read data from register 27 to its output; whereas when signal RDCY' is false, the buffer 28 sends nothing on its output and operates as an open circuit.

Similarly, all of the write request signals $WREQ_1$ thru $WREQ_n$ from the data processing units $U_1$ thru $U_n$ are received by OR gate 37; and if any one of those write request signals is in a true state, then an output signal ANTWQ from the OR gate 37 goes true. That output signal ANTWQ is sent to AND gate 40 which in turn has an output connected to the D input of flip-flop 41. When flip-flop 41 is set, its Q output generates a WSEL signal in a true state which indicates that one of the write select signals $WSEL_i$ should be made true. Which particular write select signal is made true is determined by the priority circuit 51.

In order for the flip-flop 41 to get set, all of the inputs to the AND gate 40 must be true. For that to occur, there must be a true write request signal $WREQ_i$; and in addition, two other conditions must be met. One of those conditions is that the read cycle signal RDCY must be false, and that condition insures that read data is not being placed on the time-share data bus 12d at the same time that write data is being placed on that data bus. The second condition is that the registers 21 and 22 are not full while the interrupt signal or the RSEL signal is true. This second condition insures that when the write command and its corresponding write data are sent on the primary I/O port, register 21 will be empty and ready to accept them.

After register 41 gets set, then in the next clock cycle register 42 gets set. Similarly, after flip-flop 42 gets set, then in the next clock cycle flip-flop 43 gets set. Flip-flop 42 on its Q output generates a FULL21 signal which when it is true indicates that register 21 is full and contains a write command. Similarly, flip-flop 43 on its Q output generates a FULL22 signal which when it is true indicates that register 22 is full and contains a write command.

Flip-flop 43 has its Q output connected to AND gate 48 which in turn has its output connected to the D input of flip-flop 44. When flip-flop 44 sets, it generates on its Q output a true WRCY signal which indicates that the time-shared memory 20 is performing a write command. Flip-flop 44 will set whenever register 22 is full so long as the interrupt signal INT is not true and the RSEL signal is not true. Thus, execution of the write commands WC have a lower priority than execution of the read commands RC and have a lower priority than execution of commands from the secondary I/O port.

Considering now AND gate 50, it generates a signal CKM22. When signal CKM22 is true, the registers 22a–22c in module 22 are clocked and thereby store the write command WC' and write data WD' from register 21. Signal CKM22 is true whenever register 21 is full so long as one of two conditions are met. One of those conditions is that register 22 is not full and therefore has room to store the contents of register 21. The other condition is that the next clock pulse, the command which is currently in register 22a will be performed. These two conditions are detected by OR gate 49.

Lastly, in FIG. 5, two AND gates 45 and 46 detect when the registers 21 and 22 go from a full state to an empty state. Specifically, due to AND gate 45, the signal FULL21 will go false whenever all of the write select signals are false and a command is being transferred from register 21 to register 22. Likewise, AND gate 46 causes the FULL22 signal to go false whenever register 21 is empty and during the next clock pulse a write command will be performed.

A preferred embodiment of the invention has now been described in detail. In addition, however, many changes and modifications can be made to this preferred embodiment without departing from the nature and spirit of the invention. For example, each of the data processing modules $P_1$ thru $P_n$ can be any type of data processor such as a microcomputer or a disc with a read/write controller or a work station which interacts with an operator. Likewise, the main memory module 14 can be any type of electronic memory such as a dynamic digital memory where data is refreshed periodically on a static digital memory where no refresh occurs. Accordingly, it is to be understood that the invention is not limited to the above described details but is defined by the appended claims.

What is claimed is:

1. A storage interface unit which is comprised of:

a primary I/O port that includes a clock line which carries a cyclic clock signal, a time-shared data bus, write command lines, and read command lines;

a write input circuit which receives write commands from said write command lines and simultaneously receives accompanying write data words from said time-shared data bus, at a rate of one write command and one data word per clock cycle;

several write execution modules which are serially intercoupled from said write input circuit to a time-shared memory and which execute said received write commands by passing each such command and accompanying write data word through said write execution modules in a pipelined fashion to said time-shared memory;

a read input circuit which in a single clock cycle, receives a read command while said write commands are being executed;

a control circuit having control lines coupled to said write input circuit and write execution modules and time-shared memory and read input circuit, which in response to the received read command
  a) temporarily suspends the execution of said received write commands after their passage through said execution modules has begun,
  b) read data from said time-shared memory in a first clock cycle immediately after said read command is received by bypassing said serially intercoupled write execution modules, and
  c) sends data from said memory on said time-shared data bus in a second clock cycle immediately after said first clock cycle; and a second I/O port that includes an interrupt input line for carrying an interrupt signal; and wherein said control circuit includes interrupt response logic which, while said interrupt signal is present, a) inhibits said write input circuit and read input circuit from receiving any commands, b) inhibits said serially intercoupled write execution modules from passing write commands to said time-shared memory, and c) enables said time-shared memory to be read and written from said secondary I/O port.

2. A storage interface unit according to claim 1 wherein said control circuit includes means for enabling said write input circuit to receive a write command and a write data word while read data is being retrieved from said time-shared memory in response to a read command.

3. A storage interface unit according to claim 1 wherein said control circuit is comprised of two groups of serially intercoupled flip-flop stages which are shifted from stage to stage by said clock signal and which have feedback connections between selected stages.

4. A storage interface unit according to claim 1 wherein one of said serially intercoupled circuit modules performs a first operation on the data word that it receives in a first clock cycle, a subsequent module performs a second operation on that same data word in a second clock cycle, and a single clock cycle is just long enough for said control circuit to read said data from said time-shared memory but too short for both said first and second operation to be performed therein.

5. A storage interface unit according to claim 1 wherein said write commands include a first type that do not cause said interrupt signal and a second type that do cause said interrupt signal as well as a response signal on said primary I/O port which indicates when said interrupt is complete.

6. A storage interface unit according to claim 5 wherein said control circuit includes means for enabling said write input circuit to receive a write command and write data while said interrupt signal is present and said time-shared memory is being used by said secondary I/O port.

7. A storage interface unit according to claim 6 wherein said control circuit includes means for enabling said write input circuit to receive a write command and a write data word while read data is being retrieved from said time-shared memory in response to a read command.

8. A storage interface unit according to claim 7 wherein said control circuit is comprised of two groups of serially intercoupled flip-flop stages which are shifted from stage to stage by said clock signal and which have feedback connections between selected stages.

9. A storage interface unit according to claims 8 wherein one of said serially intercoupled circuit modules performs a first operation on the data word that it receives in a first clock cycle, a subsequent module performs a second operation on that same data word in a second clock cycle, and a single clock cycle is just long enough for said control circuit to read said data from said time-shared memory but too short for both said first and second operation to be performed therein.

10. A storage interface unit according to claim 9 wherein said first operation is generating partial parity signals which indicates if certain portions of a data word have an odd number of binary "1" bits, and said second operation is using said partial parity signal to generate a final parity signal which indicates if the entire same data word has an odd number of "1" bits.

* * * * *